United States Patent [19]

Horvath et al.

[11] Patent Number: 4,681,144

[45] Date of Patent: Jul. 21, 1987

[54] AUTOMATIC FUELING APPARATUS AND METHOD

[76] Inventors: Ronald F. Horvath; Barbara L. Horvath, both of 4325 Kennedy Dr., Apt. 204, Racine, Wis. 53404

[21] Appl. No.: 825,574

[22] Filed: Feb. 4, 1986

[51] Int. Cl.$^4$ .............................................. B65B 3/04
[52] U.S. Cl. ........................................ 141/1; 141/94; 141/113; 141/284
[58] Field of Search ..................................... 141/1–12, 141/113, 250–284, 346–362, 98, 94, 95, 96

[56] References Cited

U.S. PATENT DOCUMENTS

| | | | |
|---|---|---|---|
| 3,079,960 | 3/1963 | Mays | 141/232 |
| 3,095,020 | 6/1963 | Darwin | 141/232 |
| 3,364,940 | 1/1968 | Ginsburgh et al. | 137/234.6 |
| 3,410,320 | 11/1968 | Ginsburgh et al. | 141/98 |
| 3,502,117 | 3/1970 | Nebelsiek et al. | 141/7 |
| 3,527,268 | 9/1970 | Ginsburgh | 141/98 |
| 3,530,906 | 9/1970 | Ginsburgh et al. | 141/98 |
| 3,536,109 | 10/1970 | Ginsburgh et al. | 141/98 |
| 3,642,036 | 2/1972 | Ginsburgh et al. | 141/98 |
| 4,263,945 | 4/1981 | Van Ness | 141/98 |
| 4,321,720 | 3/1982 | Havre | 141/113 |

*Primary Examiner*—Houston S. Bell, Jr.
*Attorney, Agent, or Firm*—Peter N. Jansson

[57] ABSTRACT

An improved below-ground apparatus and method for fueling a vehicle through an inlet on a exposed tank bottom. The apparatus is characterized by a frame carrying an upwardly-facing nozzle, a lift to move the frame and the nozzle from a fully-retracted to an intermediate position and from the intermediate position to a position for full engagement with the inlet. The intermediate position is determined by sensing the vertical position of the tank bottom and, at the intermediate position, the nozzle member is positioned on the frame in vertical alignment with the inlet prior to final lifting. In preferred embodiments, a blower creates an air ride for the nozzle member facilitating its positioning on the frame, and another blower creates a vacuum to hold the nozzle member is proper position and to eliminate fuel vapors. The nozzle member is preferably conical in shape.

29 Claims, 10 Drawing Figures

AUTOMATIC FUELING APPARATUS AND METHOD

FIELD OF THE INVENTION

This invention relates to apparatus for transferring a liquid from fuel storage to a vehicle tank and, more particularly, to automatic fueling of vehicles at retail fueling stations.

BACKGROUND OF THE INVENTION

Retail selling of gasoline and other vehicle fuels is a major industry throughout the world. By one reason recent estimate, there are on the order of 200,000 retail fuel service stations in the United States alone.

Such stations are referred to as either "full service" stations or "self service" stations, depending on whether a station employee or the customer himself is responsible for manipulating the pump, fuel hose, and valve structure into position for fueling the vehicle. In either case, however, substantial human activity is required by a person outside the vehicle in order to accomplish the fueling of the vehicle fuel tank.

The tremendous rise in the number of self-service stations in recent years has been one of very few significant changes in the methods of operating fuel stations. Many customers, particularly women drivers, are very reluctant to exit their vehicles and put themselves through the trouble of manipulating the hose and nozzle to fill their tanks. But many people, often the same people, are equally reluctant to pay the added costs of a full-service station.

In view of the extremely high volume of retail fuel sales, the high costs of providing full service, and the inconvenience for a customer of all the manipulative steps necessary for vehicle fueling, a need exists for improved fueling station methods and apparatus. A need also exists for improved safety in the operation of fueling stations.

A number of attempts have been made in the prior art to improve fueling procedures in the retail vehicle fueling industry. Some examples include the disclosures of the following U.S. patents:

U.S. Pat. No. 3,079,960 (Mays)
U.S. Pat. No. 3,095,020 (Darwin)
U.S. Pat. No. 3,364,940 (Ginsburgh et al.)
U.S. Pat. No. 3,410,320 (Ginsburgh et al.)
U.S. Pat. No. 3,502,117 (Nebelsiek et al.)
U.S. Pat. No. 3,527,268 (Ginsburgh)
U.S. Pat. No. 3,530,906 (Ginsburgh et al.)
U.S. Pat. No. 3,536,109 (Ginsburgh et al.)
U.S. Pat. No. 3,642,036 (Ginsburgh et al.)
U.S. Pat. No. 4,263,945 (Van Ness).

These patents describe various methods and types of apparatus for facilitating fueling, and for automatic fueling using overhead, on-ground or below-ground equipment. The Ginsburgh et al. patents describe in great detail an automatic overhead fueling system.

Each of the prior disclosures of automatic fueling apparatus and methods has substantial inherent practical problems. The apparatus in some cases is far too complex and costly. In some cases, the basic concepts for engaging fueling lines with the vehicle fuel tanks are impractical. One prior system undertakes the task of identifying vehicle types in order to locate and properly engage the fueling inlets on the hundreds if not thousands of kinds of vehicles. The practical technical problems encountered in such an undertaking are enormous, and such systems have not been successful.

It suffices to note here that a need exists for improved practical automatic vehicle fueling equipment and methods.

SUMMARY OF THE INVENTION

This invention involves a system—both a method and apparatus—for automatically filling liquid fuels into automobiles and other vehicles at vehicle fueling stations, without the need for manual intervention. The apparatus and method of this invention overcome many of the problems of systems of the prior art.

More specifically, this invention involves a specialized below-ground apparatus for fueling vehicles above it through an inlet located on the bottom of the vehicle tank. In the apparatus and method of this invention, a fueling nozzle protrudes upwardly from beneath the surface of the ground, under the control of special guidance and control means, to penetrate and engage a specialized receiving unit (or intake device) which is generally flush with the bottom of the vehicle fuel tank. The tank itself is exposed at the bottom of the vehicle, and preferably has a flat bottom.

Before operation of the below-ground apparatus of this invention can begin, a vehicle must be driven into position over the below-ground apparatus. While such vehicle positioning is occurring, the below-ground apparatus is covered by a door or doors, preferably a pair of sliding doors which are generally flush with the ground. The doors are subsequently opened to expose the specialized filling apparatus.

Lines or other guidance means on or beside the path of the car enable the driver to drive the vehicle into a position at which the vehicle fuel tank is in approximately the right position over the specialized filling apparatus. Such proper approximate positioning of the vehicle over the specialized filling apparatus may be further aided by the use of a locating means, such as a wire protruding upwardly from the ground level, which signals when the vehicle is positioned with its fuel tank above the specialized filling equipment. A tank locator such as this can operate a signal light, or other signal means, to indicate to the driver when to stop the vehicle. Such a tank-locating means does not form a part of this invention.

The system is preferably arranged such that, prior to driving and parking the vehicle over the specialized filling apparatus, the driver has operated a control panel next to the vehicle pathway. In operating the control panel, the driver orders the desired amount of fuel and perhaps makes arrangements for payment via his credit card or by other means.

The details of such a control apparatus do not form a part of this invention. However, its location at a position along the vehicle path such that it can be operated prior to driving over the below-ground filling apparatus provides at least one of two advantages: It either allows the driver himself to park the vehicle in about the right position, that is, with the vehicle fuel tank over the below-ground apparatus, or it eliminates the need for a large and/or complex movable control panel of some sort, which could be operable by drivers of vehicles with fuel tanks located under their vehicles either near the front, near the back, or near the middle of the vehicle.

The below-ground apparatus itself includes a frame and means to lift the frame from a fully retracted position to an intermediate position, and from an intermediate position to an upward fueling position. In each of these positions, the frame is preferably centered on a vertical centerline defined by a pneumatic or hydraulic cylinder forming the lift means. Carried by the frame is an upwardly-facing nozzle member which is free to move horizontally on the frame within defined limits. The nozzle member engages the inlet of the vehicle tank to fuel the tank through the tank bottom.

The below-ground apparatus of this invention also includes means to sense the vertical position of the tank. Such sensing is facilitated by the generally flat bottom of the fuel tank and by the fact that the fuel inlet on the tank bottom is generally centered on the tank bottom. The sensing means is preferably a probe which extends vertically upwardly from a retracted position to a position of contact with the tank bottom. After contacting the tank bottom, such probe remains in contact with the tank bottom for a subsequent operation. The probe is preferably operated by a pneumatic or hydraulic cylinder.

When the sensing means has sensed the vertical position of the tank above it, the frame is lifted by its lift cylinder. The lifting of the frame toward the tank bottom continues until means responsive to the sensing means stops the lifting action. This occurs when the frame and nozzle member reach an intermediate position just below the tank bottom.

The probe which is preferably used as the means to sense the vertical location of the tank bottom, has a first signal means which is interactive with a second signal means carried by the frame. The first and second signal means are interactive when the frame reaches the intermediate position. One of the signal means is preferably a photocell light and the other a reflector, and these two devices face each other and are oriented on the same line to interact when the frame reaches the intermediate position, close to the vehicle tank.

The frame is stopped at the intermediate position in order that the nozzle, carried by the frame, can be moved horizontally on the frame as required to get into vertical alignment with the tank inlet above. To accomplish this, means to position the nozzle member is actuated. When such alignment is completed, the nozzle member is held in the proper position and the frame and nozzle are lifted until the nozzle engages the tank inlet.

The preferred positioning means is a means to release the nozzle member from the frame. A number of structural features of the frame assembly and the nozzle, as well as other parts of the below-ground apparatus, characterize a preferred release means.

The frame preferably has an bed member with a horizontal upper surface defining an array of apertures. The bed member has an upwardly-extending edge around it to retain the nozzle member on its horizontal upper surface. A blower supplies air through the apertures in the bed member. This provides an air cushion between the horizontal upper surface of the bed member and the nozzle during one step in the operation of this preferred embodiment. The nozzle member is released from its position of rest on the upper surface of the bed member by being lifted slightly above it and the nozzle member is thus free to move horizontally on the bed member.

The nozzle member is preferably designed to facilitate the air-ride release from the frame member. The nozzle member preferably includes a vertical outlet member and a base element having a horizontal lower surface adjacent to the upper surface of the bed member. The base element preferably has a planar contact edge and the lower surface is recessed. This helps to maximize the lifting power of air passing through the bed member apertures.

The outlet member of the nozzle member is preferably a cone with its broad proximal end attached to the base element and a tapered wall extending to a narrow distal end which defines a fuel outlet. This conical nozzle shape facilitates insertion of the nozzle member into the fuel inlet at the tank bottom.

The nozzle-positioning means also preferably has means to rapidly and repetitively tilt the bed member slightly in various directions to move the nozzle member horizontally in varying directions across the horizontal upper surface of the frame while the air-ride means is operating. During such movement, the nozzle will come into proper alignment with the inlet above.

And, the positioning means includes means on the nozzle member to detect the inlet location and to deactivate the air blower to end the air ride of the nozzle member. This causes the nozzle member to come to rest on the frame in a position of vertical alignment with the fuel tank inlet.

The detecting means is preferably a photocell means, most preferably including a pair of vertically-oriented photocell lights directed upwardly, one on either side of the tapered conical nozzle wall. A reflector ring, which is mounted on the tank concentrically with the fuel inlet, reflects beams emitted by each of the photocell lights when they hit it. When both of the photocell lights are receiving reflected beams, the nozzle member is in vertical alignment with the fuel inlet.

The concurrent reception of reflected light by the two photocell lights triggers a control device to deactivate the blower and activate another blower which sucks air downwardly through the apertures in the bed member. This not only allows the nozzle member to come to rest on the upper surface of the bed member, but serves to hold the nozzle member in place on it.

The condition of alignment also actuates the lift means to raise the frame and nozzle, now in the proper horizontal position, for its engagement with the fuel tank inlet. The fuel tank has an inlet member specifically designed to receive the specialized below-ground fueling apparatus of this invention. The inlet apparatus will be described in greater detail hereafter.

The method of this invention includes sensing the vertical position of the tank, lifting a nozzle-supporting frame, such as that described above, from a retracted below-ground position to an intermediate vertical position which is fixed by the tank sensing step, positioning the nozzle member which is carried by the frame at a position on the frame in vertical alignment with the fuel inlet, and further lifting the frame until the nozzle member engages the fuel inlet.

The sensing step preferably includes sensing the position of the tank bottom, most preferably by means of raising a probe until it contacts the tank bottom. The probe means is preferably kept in its position of contact with the tank bottom during the frame-lifting step and the probe means includes a first signal means. As described above, the frame preferably has a second signal means which is interactive with the first signal means and, when the first and second signal means interact, the lifting of the frame and nozzle are discontinued.

The positioning step, in which the nozzle member is placed at the right location with respect to the frame which carries it, preferably includes releasing the nozzle member from engagement with the frame, moving it horizontally with respect to the frame, and depositing it back in contact with the frame at the correct position, in vertical alignment with the fuel inlet. In the most preferred case, the releasing step includes blowing air under the nozzle member to create an air ride for the nozzle member. After the releasing step has been completed, the nozzle member is preferably secured to the frame in its position of alignment with the inlet.

Such securing step preferably includes evacuating air around and beneath the nozzle member. Such evacuating step also serves to remove fuel vapors and spillage during the pumping of fuel into the vehicle tank.

The below-ground apparatus of this invention may be constructed at modest cost and is relatively simple in construction and operation. The method and apparatus of this invention eliminate the necessity of human intervention in physically manipulating a fuel tank, fuel hose, and valve structure into the inlet of a vehicle fuel tank. This invention can reduce the safety concerns about manual operation of pumps for volatile fuels by inexperienced operators.

The apparatus and method of this invention eliminate the often unsightly above-ground fuel pumps which have been an unchanging characteristic of the vehicle service stations of the world since the dawn of the automotive age. This invention can revolutionize fuel retailing for automotive vehicles.

OBJECTS OF THE INVENTION

It is an object of this invention to provide an improved apparatus and method for fueling vehicles.

Another object of this invention is to provide an automatic fueling system for vehicles which is practical in construction an operation.

Another object of this invention is to provide an automatic fueling system for retail fuel stations which is primarily below the ground.

Another object of this invention is to provide a below-ground apparatus for fueling vehicles which eliminates the need for above-ground pumps.

Another object of this invention is to provide an apparatus and method for vehicle fueling which is convenient.

Another object of this invention is to provide an improved automatic fueling system for vehicles which eliminates problems and dangers associated with the handling of volatile liquid.

These and other objects will be apparent from the following additional descriptions and from the drawings wherein:

DETAILED DESCRIPTIONS OF PREFERRED EMBODIMENTS

Figure 2:
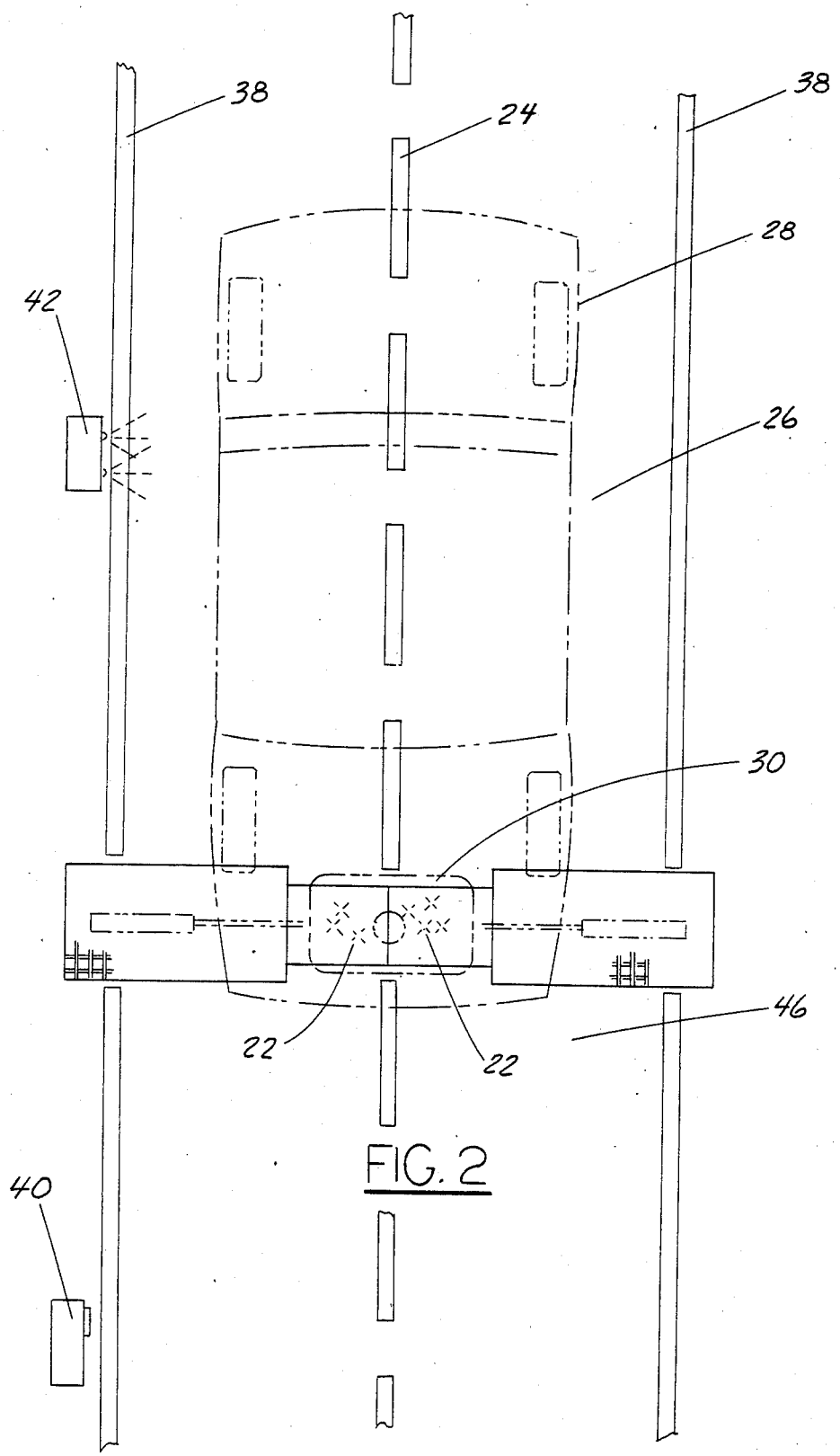
FIG. 2 is a plan view illustrating the positioning of certain elements of this invention with respect to a vehicle.

The figures illustrate a preferred below-ground fueling apparatus 20. FIG. 2 is a plan view which illustrates the location of the below-ground fueling apparatus, itself not shown.

Below-ground fueling apparatus 20 is beneath a pair of sliding doors 22. Sliding doors 22 move, in a direction parallel to the surface of the ground 46, away from the center line 24 of a fueling location 26. Vehicles 28 park one after another at location 26 for fueling.

Each vehicle 28 has a vehicle fuel tank 30 having an exposed, preferably flat, vehicle tank bottom 32 which is centered on the fore-to-aft centerline of vehicle 28. On tank bottom 32 is a fuel inlet member 34, illustrated best in FIGS. 1, 5, and 6. Fuel inlet member 34 includes an inlet 36 which is located along the vehicle centerline. Fuel tank 30 of vehicle 28, which is illustrated in FIG. 2, is located behind the rear axle. However, other locations along the vehicle centerline are equally acceptable.

Fuel location 26, in addition to having a centerline 24, has side guidelines 38 which are helpful to vehicle drivers in properly locating their vehicles on fueling location 26. Along the path leading to fueling location 26, on the driver's side, is an above-ground control panel 40 which is operated by the driver before he drives and parks his vehicle over below-ground fueling apparatus 20.

Control panel 40 may have a number of features and be operated in a number of different ways. The details of the operation of control panel 40 do not form part of this invention. However, the driver preferably orders the amount of gasoline he wants by operation of control panel 40 and thereafter drives vehicle 28 onto fueling location 26. This has the advantages described above.

The driver stops his vehicle when its fuel tank 30 is above sliding doors 22. This operation may be facilitated in the manner generally described above. Beside fueling location 26 is an indicator light panel 42 which displays a green light as vehicle 28 drives into fueling location 26, and, when vehicle 28 reaches the right position, displays a red light indicating that the vehicle should be stopped. In this way, when vehicle 28 is parked, its fuel tank 30 is approximately centered over the center of sliding doors 22 and thus in position for inlet 36 to be "found" and engaged for fueling.

Figure 1:
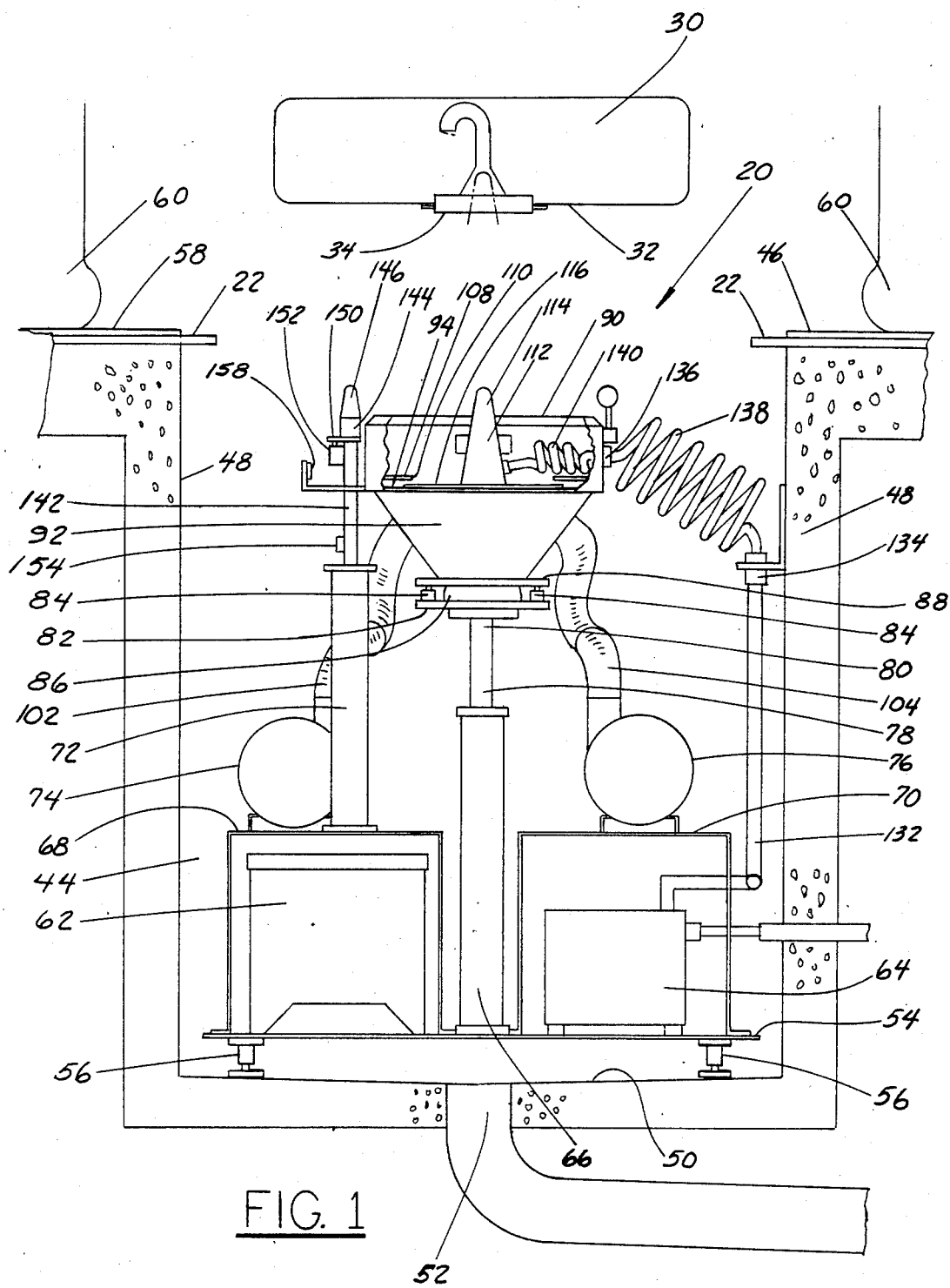
FIG. 1 is a side elevation, partially broken away and partially in section (without background), of the below-ground apparatus of this invention.
Figure 3:
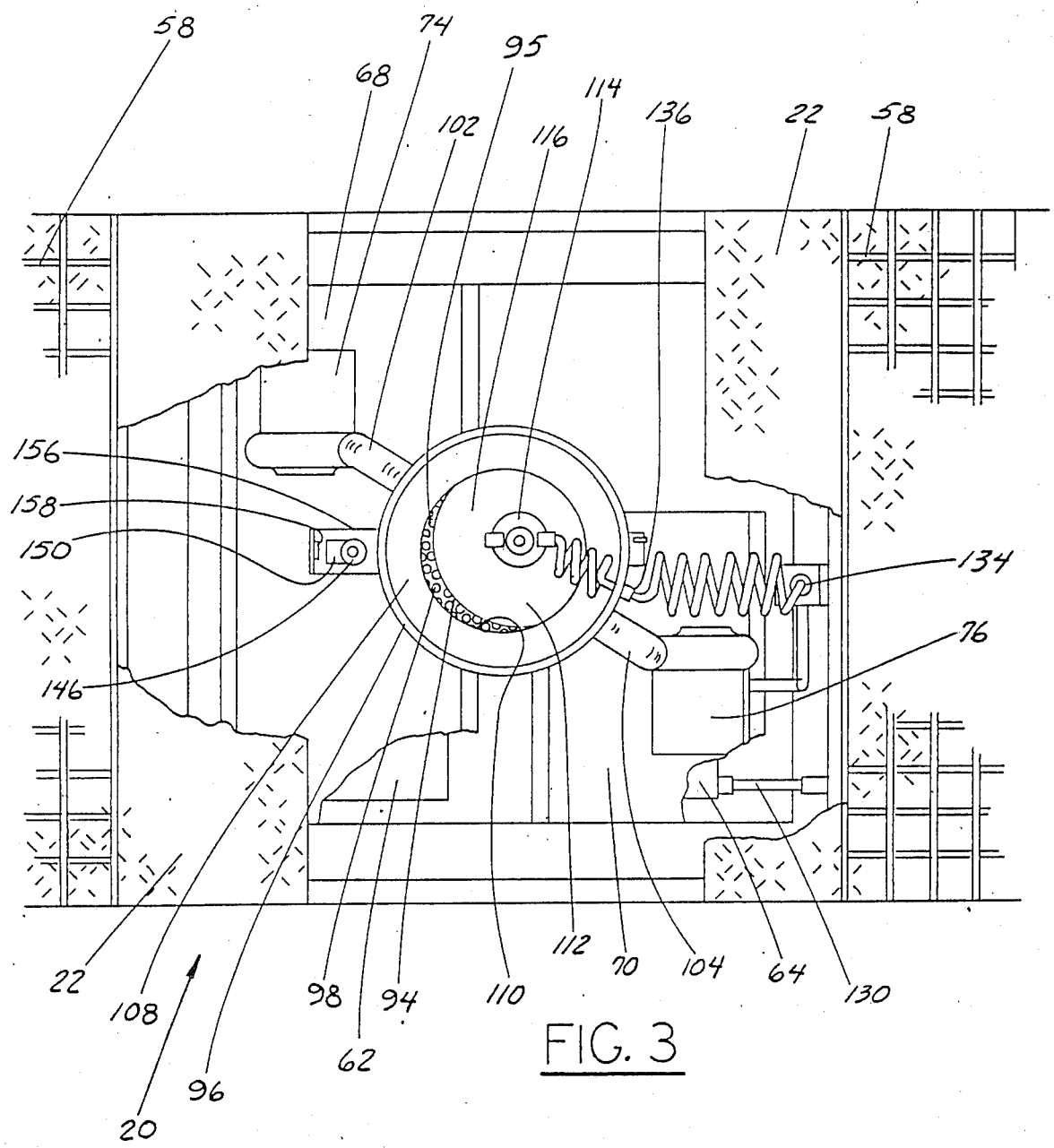
FIG. 3 is an enlarged plan view of FIG. 1, with the overhead sliding doors in a slightly different position than shown in FIG. 1.
Figure 4:
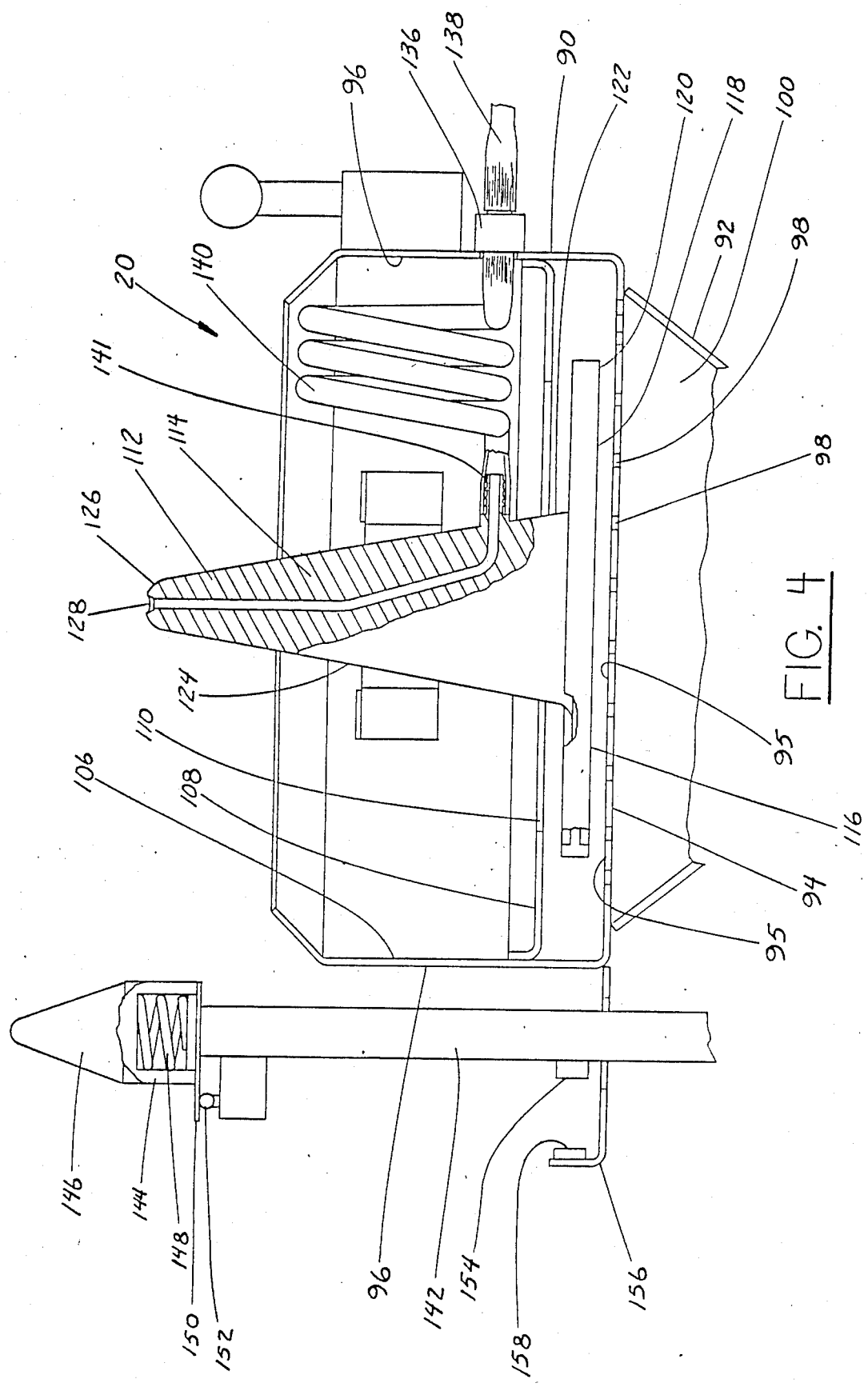
FIG. 4 is a fragmentary side elevation of FIG. 3, partially in section.

FIGS. 1, 3 and 4 illustrate below-ground fueling apparatus 20 in detail. Fueling apparatus 20 is mounted in a pit 44 below the level of ground surface 46. Pit 44 includes sidewalls 48 and a floor 50, preferably all made of concrete. Floor 50 has a drain 52, such that water flowing into pit 44 will not collect there, but will exit pit 44. A short distance above floor 50 is a mounting plate 54. Mounting plate 54 is supported by legs 56 which may be adjusted to level mounting plate 54. In this way, imperfections in the construction of pit 44 can be accommodated.

In FIG. 1, sliding doors 22 are shown in the full open position, while in FIG. 3 they are shown in a partially open position Sliding doors 22 are mounted under and slide under vehicle support surfaces 58, which are stationary. In FIGS. 1 and 7-10, level ground surface 46 and the tires 60 of vehicle 28 thereon are illustrated to help visualize the position and orientation of the parts of the apparatus of this invention during operation.

Mounted on mounting plate 54 is a hydraulic supply 62, a fuel pump 64, a centrally-located main hydraulic lift cylinder 66, and first and second mounting pedestals 68 and 70, respectively. Mounted on first mounting pedestal 68 is a hydraulic probe cylinder 72 and a first blower 74. Mounted on second mounting pedestal 70 is a second blower 76.

Main hydraulic lift cylinder 66 includes a movable shaft 78. Affixed at the distal end 80 of movable shaft 78 is a circular pedestal plate 82. Four one-way spring-loaded valves 84 are space around the periphery of pedestal plate 82. One-way spring-loaded valves 84, along with a resilient elastic mounting bearing 86, serve to support a circular frame base plate 88. Resilient elastic mounting bearing 86 is between pedestal plate 82 and frame base plate 88, and allows frame base plate 88 to tilt slightly to accommodate off-center downward forces applied thereto, as can occur during insertion of the nozzle into the fuel tank inlet.

Frame base plate 88 is part of a frame assembly 90. Frame assembly 90 includes a frusto-conical funnel 92, the smaller end of which is rigidly attached to fram base plate 88. Rigidly attached to the upper wide end of frusto-conical funnel 92 is a flat horizontal bed member 94 which has a cylindrical edge wall 96 thereabout. Bed member 94 has a horizontal upper surface 95 which has an array of closely-spaced apertures 98 over its entire surface. Apertures 98 allow air to pass through bed member 94 in either direction. Frusto-conical funnel 92 defines an air plenum 100 beneath bed member 94.

First and second blowers 74 and 76 are in pneumatic communication with air plenum 100 by means of flexible air hoses 102 and 104, respectively. First blower 74 is arranged to draw air out of air plenum 100 and second blower 76 is arranged to blow air into air plenum 100, for purposes which will hereafter become apparent.

Secured to the inner surface 106 of cylindrical edge wall 96, and extending radially inwardly with respect to the centerline defined by main hydraulic lift cylinder 66, is a horizontal retainer ring 108. Retainer ring 108 has an inner edge 110 which defines an opening through which a portion of a nozzle member 112 extends.

Nozzle member 112, which is the portion of below-ground fueling apparatus 20 engageable with tank inlet 36 during fueling, is movable with respect to frame assembly 90. Nozzle member 112 includes a cone 114, which forms a vertically-oriented outlet member, and a base element 116. The details of nozzle member 112 are illustrated best in FIG. 4.

Base element 116 has a horizontal lower surface 118 which is generally parallel to and in contact with upper surface 95 of horizontal bed member 94. Base element 116 also includes a planar contact edge 120 which surrounds horizontal lower surface 118. Lower surface 118 is recessed somewhat from planar contact edge 120. As previously indicated, this configuration of the lower surface of nozzle member 112 facilitates its air ride on bed member 94.

Cone 114 has a broad proximal end 122, which is secured to base element 116, and a tapered wall 124 which extends upwardly from base element 116 to a narrow distal end 126. A fuel outlet 128 is formed in distal end 126. The tapering of cone 114 allows distal end 126 to be easily inserted into tank inlet 36 and, in doing so, to open inlet 36 in a manner hereafter explained. The conical configuration of nozzle member 112 also allows it to form a fluid-tight seal with respect to fuel inlet 36.

Liquid fuel reaches nozzle member 112 in the following manner: A fuel pipe 130 extends from a fuel storage tank not shown, which is underground as in existing service stations, to fuel pump 64. Another fuel pipe 132 extends from fuel pump 64 upwardly along one of the side walls 48 of pit 44 to a connection member 134. Extending from connection member 134 to a connection member 136 on cylindrical edge wall 96 is a flexible fuel line 138. The flexibility of fuel line 138 accommodates varying positions of frame assembly 90 with respect to connection member 134. A flexible fuel hose 140 runs from connection member 136 on cylindrical edge wall 96 to a connection member 141 on cone 114, the distal end 126 of which is inserted in tank inlet 36. Flexible fuel hose 140 is sufficiently supple to allow relatively free movement of nozzle member 112 with respect to frame assembly 90, as hereafter described.

Mounted on the movable shaft 142 of hydraulic probe cylinder 72 is a probe assembly 144. Probe assembly 144 includes a distal end member 146 which is supported at the end of movable shaft 142 by a spring 148. Distal end member 146 includes a stop member 150 which is positioned beside movable shaft 142 just above a stop switch 152 mounted thereon. When distal end member 146 engages tank bottom 32, movable shaft 142 will continue moving upwardly until stop switch 152 engages stop member 150. Control means actuated by stop switch 152 will deactivate hydraulic probe cylinder 172.

Also mounted on movable shaft 142 is a photocell light 154. As illustrated best in FIG. 3, a reflector mount 156 extends radially outwardly from cylindrical edge wall 96 and around movable shaft 142, and has a reflector 158 mounted thereon. Photocell light 154 is aimed horizontally in a radially-outward direction and reflector 158 is oriented along the same radius. By virtue of such location and orientation, the beam from photocell light 154 will hit reflector 158 and the reflection will return in the opposite direction to be sensed by photocell light 154. When frame assembly 90, which is being lifted by main hydraulic lift cylinder 66, reaches a position at which photocell light 154 and reflector 158 interact, a control means not shown is actuated to deactivate hydraulic lift cylinder 66.

Referring again to nozzle member 112, its base element 116 is circular and has a diameter less than the inner diameter of cylindrical edge wall 96. Cylindrical edge wall 96 serves as means to limit the horizontal movement of nozzle member 112 over upper surface 95 of bed member 94. Furthermore, base element 116 of nozzle member 112 and inner edge 110 of retainer ring 108 are dimensioned such that whatever position nozzle member 112 has with respect to upper surface 95, a portion of base element 116 will be located beneath retainer ring 108. Thus, nozzle member 112 will remain in a position with horizontal lower surface 118 of its base element 116 closely adjacent to upper surface 95 of bed member 94.

When second blower 70 is activated, the pressure in air plenum 100 rises and air will be rapidly blown through apertures 98. This air will form an air ride for nozzle member 112, as air is applied upwardly against horizontal lower surface 118. While nozzle member 112 is thus released from firm contact with bed member 94, the sequential, repeated rapid activation of one-way spring-loaded valves 84 causes a slight and variable tilting of upper surface 95 away from an exact horizontal orientation, which jostles nozzle member 112 slightly. This causes nozzle member 112 to move around upper surface 95 within the limits imposed by cylindrical edge wall 96.

Figure 5:
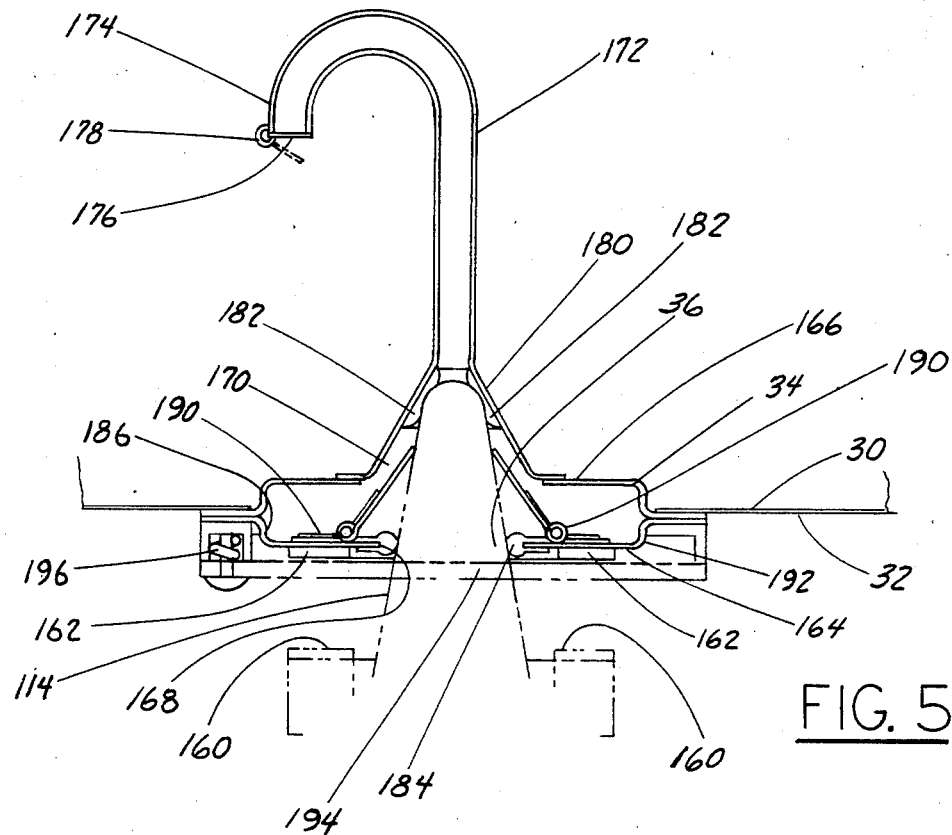
FIG. 5 is a fragmentary side sectional view of a fuel-receiving unit (or "inlet member") on the bottom of a vehicle fuel tank, with its removable cover member and the nozzle member of the below-ground apparatus of this invention illustrated in phantom lines.
Figure 6:
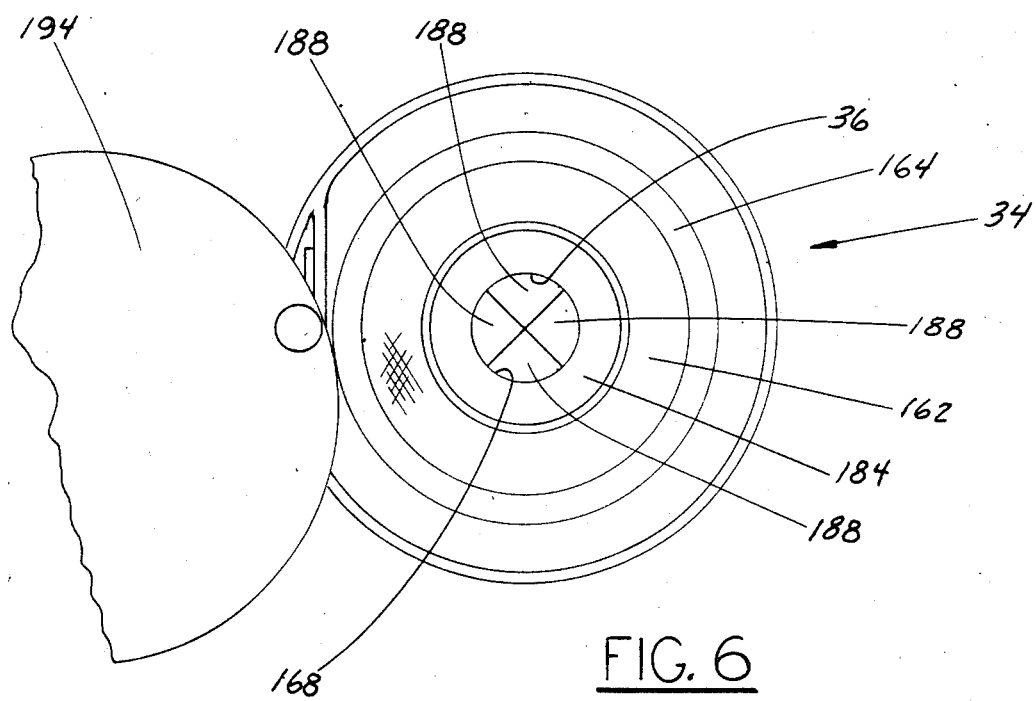
FIG. 6 is a bottom view of FIG. 5, with the cover of the receiving unit open.

Mounted on the opposite sides of tapered wall 124 of conical nozzle 114 are a pair of photocell lights 160 which are aimed vertically in an upward direction. As illustrated in FIGS. 5 and 6, a reflector ring 162 is on the bottom 32 of fuel tank 30, concentrically encircling fuel inlet 36. Reflector ring 162 has a diameter about equal to the horizontal dimension between the two photocell lights 160.

When nozzle member 112 is released from bed member 94 by the air ride previously described, its movement across bed member 94 will eventually position it such that both photocell lights 160 receive reflected signals back from reflector ring 162. This indicates that distal end 126 of nozzle member 112 is in vertical alignment with inlet 36. Concurrent signals from both of the photocell devices 160 actuates control means (not shown) which deactivates second blower 76. This terminates the air ride of nozzle member 112 and immediately deposits it on bed member 94, with the nozzle in vertical alignment with inlet 36.

The same signals also activate first blower 74, which creates a vacuum effect at upper surface 95 of bed member 94, drawing nozzle member 112 firmly against bed member 94 and serving to hold nozzle member 112 in place for subsequent engagement with inlet 36, as hereafter described.

FIGS. 5 and 6 illustrate a preferred inlet member 34 which is substantially flush with tank bottom 32. Inlet member 34 is welded to an opening in tank bottom 32. Inlet member 34 has outer and inner horizontal walls 164 and 166, respectively, to which various elements are secured.

Outer horizontal wall 164 defines a circular opening 168 which is sized to receive distal end 126 of conical nozzle 114. Likewise, inner horizontal wall 166 has a circular opening 170 which is vertically aligned with circular opening 168 and which is sufficient in size to receive at least a portion of the tip of distal end 126 of cone 114.

Secured about opening 170 and extending upwardly into fuel tank 30 is a standpipe 172. Standpipe 172 has an inverted J-shaped configuration and terminates in an outlet end 174. Gasoline or other liquid fuel pumped through standpipe 172 passes through outlet end 174 into fuel tank 30, and standpipe 172 serves to contain fuel within fuel tank 30 by isolating the fuel from its inlet 36. At outlet end 174 is a cover 176 which is biased to a closed position by a wrap spring 178. Cover 176, however, allows ready passage of fuel into fuel tank 30.

Standpipe 172 has an outwardly flared lead end 180, which is widest at is point of attachment to inner horizontal wall 166. The inside surface of outwardly flared lead end 180 has a elastic seal material 182 bonded thereto which, when engaged by distal end 126 of cone 114, provides sealed engagement to prevent leakage of fuel during fueling. Likewise, an elastic annular static edge seal 184 is engaged about circular opening 168. Edge seal 184 is located and dimensioned to provide a additional fluid-tight seal against tapered wall 124 of cone 114 during filling of fuel tank 30.

On the inside surface 186 of outer horizontal wall 164 are four sector doors 188 which together cover inlet 36. Sector doors 188 are hinge-mounted and are biased by springs 190 to a horizontal closed position. Sector doors 188 are opened by the insertion of distal end 126 into opening 168 and, during the pumping of fuel through conical nozzle 114 and stand pipe 172, sector doors 188 press against tapered wall 124 of cone 114. Upon withdrawal of cone 114 from opening 168, sector doors 188 close.

Reflector ring 162, previously described, is secured on the outside surface 192 of outer horizontal wall 164. Reflector ring 162 serves to help align conical nozzle 114 with inlet 36.

Covering essentially the entire inlet member 34 is a protective door 194. Protective door 194 is biased by a coil spring 196 to a closed position but may be moved by a cable (not shown), operable by the driver from the driver seat, to uncover inlet member 34. Protective door 194 serves to shield sector doors 188 and reflector ring 162 from road dirt and the like.

Figure 7:
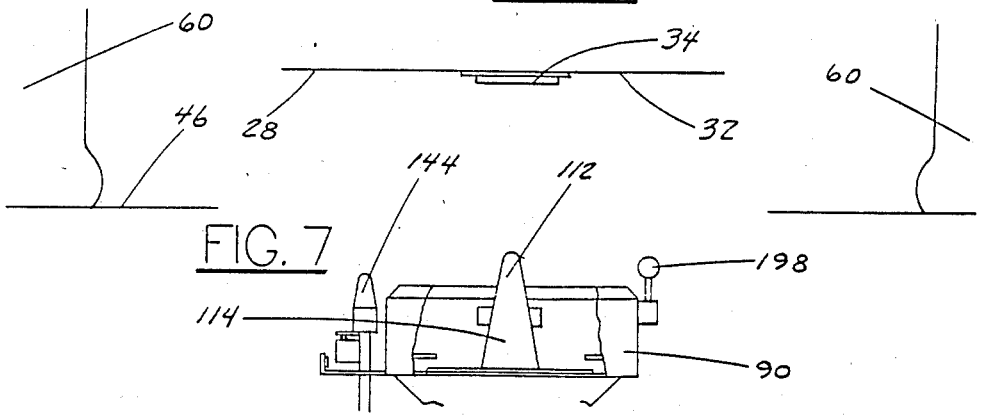

A further explanation of the apparatus of this invention will result from a description of the method of this invention, made with particular reference to sequential FIGS. 7–10, as follows:

FIG. 7 illustrates both probe assembly 144 and frame assembly 90, which carries nozzle member 112, in their fully retracted positions. However, a vehicle having tires 60 and fuel tank 30 is positioned over belowground fueling apparatus 20. The driver of the vehicle has already given instructions for his fuel order using control panel 40. Such instructions were given prior to positioning his vehicle as shown in FIG. 7. And, since the driver followed centerline 24 and any other indicator in use in driving onto fueling location 26, tank bottom 32 and fuel inlet member 34 of his vehicle are positioned generally above frame assembly 90 and nozzle 112 of the below-ground filling apparatus.

Figure 8:
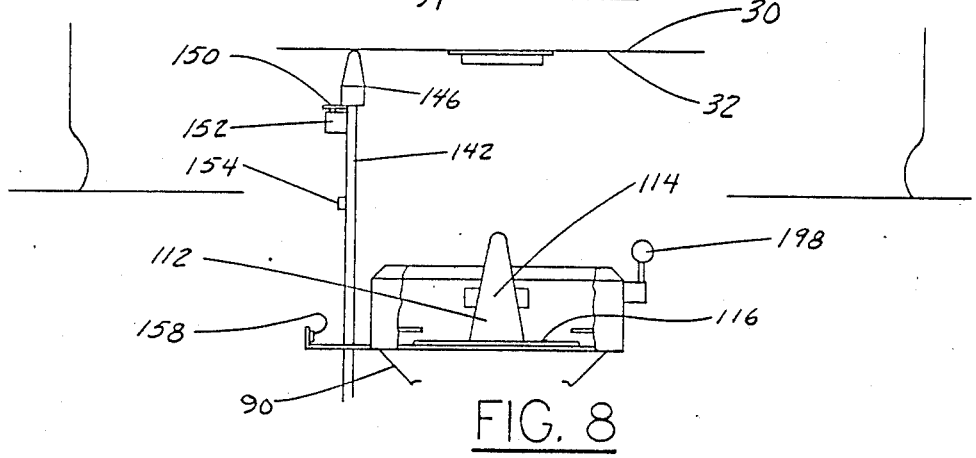

In FIG. 8, movable shaft 142 has been driven upwardly as hydraulic probe cylinder 72 is operated. Distal end member 146 of probe assembly 142 has engaged tank bottom 32, and the continued upward movement of movable shaft 142 has caused stop switch 152 to engage stop member 150. This has terminated the upward movement of movable shaft 142 by control means not shown. However, such probe assembly 144 remains in its upward position, as illustrated in FIG. 8.

Figure 9:
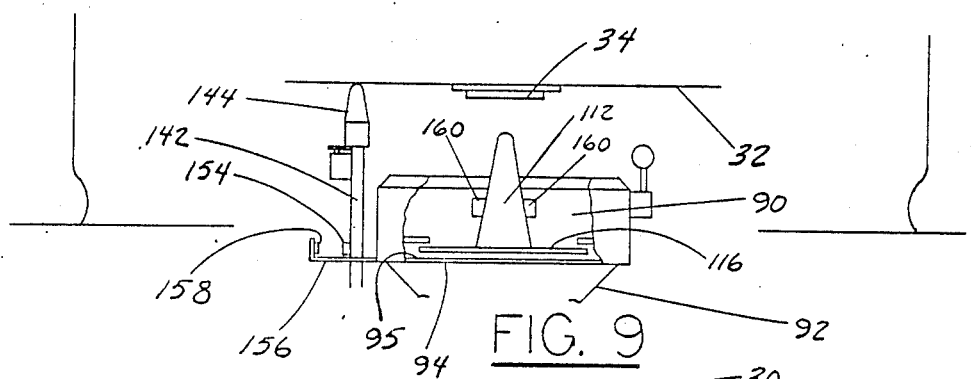

In FIG. 9, frame assembly 90 has been lifted by main hydraulic lift cylinder 66 until reflector 158, which is carried by reflector mount 156 of frame assembly 90, has reached the horizontal beam of photocell light 154. The interaction of these two signal means deactivates main hydraulic lift cylinder 66, and frame assembly 90 remains in this intermediate position as nozzle member 112 "finds" the position on bed member 94 at which it is vertically aligned with inlet 36.

FIG. 9 illustrates such positioning step. The interaction of photocell light 154 and reflector 158, previously described, also actuates second blower 76 which provides an air ride for nozzle member 112 just above horizontal bed member 94. During such air ride, nozzle member 112 is in frequent loose bumping contact with upper surface 95 of bed member 94. Such jostling contact is caused in part by the operation, at that time, of the one-way spring-loaded valves 84. One-way spring-loaded valves 84 are repetitively and sequentially actuated to rapidly tilt bed member 94 slightly in varying directions. Such tilting is in various directions slightly away from the usual horizontal orientation of upper surface 95. This causes nozzle member 112 to move about bed member 94 within the limits imposed by cylindrical edge wall 96.

When the two photocell lights 160, not shown in FIG. 9, concurrently receive return reflections from reflector ring 162, also not shown in FIG. 9, second blower 76 is deactivated and first blower 74 is activated. This immediately terminates the air ride for nozzle member 112 and causes it to be drawn firmly against bed member 94. It also causes the reactivation of main hydraulic cylinder 66, to resume the lifting of frame assembly 90 and nozzle member 112 upwardly into engagement with inlet 36, as will shortly be described with reference to FIG. 10.

First blower 74, which provides a vacuum means, and resilient elastic mounting bearing 86 both serve to facilitate successful engagement of conical nozzle member 112 with fuel tank inlet 36. As noted, first blower 74 acts through bed member 94 to hold nozzle member 112 firmly against upper surface 95. During the insertion of cone 114 into tank fuel inlet 36, if cone 114 is not precisely aligned with the center of inlet 36, frame assembly 90 can tilt slightly by virtue of resilient elastic mounting bearing 86 to accommodate such slight off-center conditions. And, the vacuum created by first blower 74, which holds nozzle member 112 in its position on bed member 94, is weak enough that it will permit additional horizontal movement of nozzle member 112 with respect to bed member 94. In this way, when cone 114 is fully engaged with inlet 36, it can be at or extremely close to the true center of inlet 36.

Figure 10:
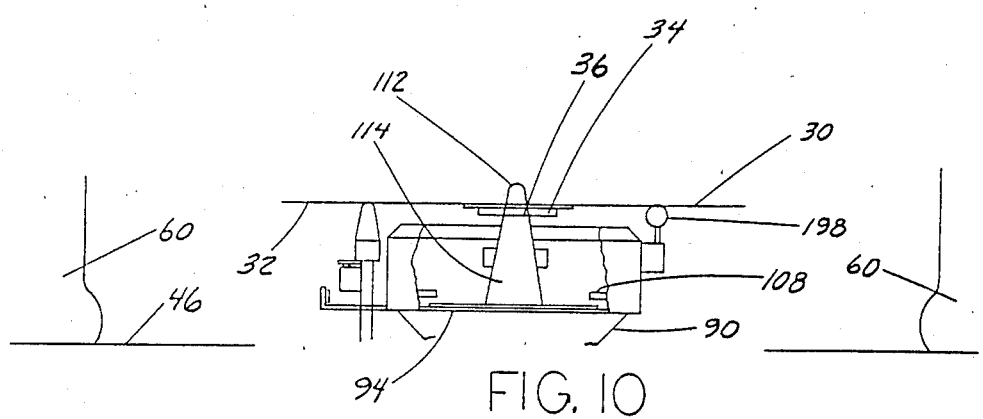
FIGS. 7–10 are schematic side elevations illustrating the operation of the fueling system of this invention.

FIG. 10 illustrates the full upward position of frame assembly 90 and the full engagement of nozzle member 112 with fuel inlet 36. As previously noted, main hydraulic lift cylinder 66 lifted frame assembly 90 from the intermediate position of FIG. 9 to the fully-raised position of FIG. 10. Such lifting action is deactivated by the tripping of a stop switch 198, which is attached to the outside of cylindrical edge wall 96 of frame assembly 90. When stop switch 198 engages tank bottom 32, main hydraulic lift cylinder 66 is again deactivated, through control means not shown.

By then, cone 114 of nozzle member 112 has penetrated inlet 36, pushing sector doors 188 open and reaching sealed engagement with seal material 182 and edge seal 184, as illustrated in FIG. 5. The operation of stop switch 198 also activates fuel pump 64 and fuel passes through fuel pipe 130, fuel pipe 132, connection member 134, flexible fuel line 138, connection member 136, flexible fuel hose 140, and finally into nozzle member 112 through connector 141, to exit fuel outlet 128 in distal end 126 of cone 114.

From there, fuel passes through standpipe 172 into fuel tank 30. Fueling ends according to the instruction provided by the vehicle driver by means of control panel 40. Fueling can be ended by means of a control associated with cover 176 at outlet end 174 of standpipe 172, or by any other appropriate means.

Venting can be accomplished in various ways. For example, vent means can be run parallel to standpipe 172 and provision made in nozzle member 112 for that purpose. Or, since each fuel tank has another inlet, accessed from the side or back of the vehicle, the cap on such inlet can have a pressure-opening vent which will relieve the raised pressure within the tank which can occur during fueling.

During fueling, first blower 74 not only serves to hold nozzle member 112 at the correct horizontal location on bed member 94, but also serves to remove fuel vapors and any fuel spillage which occurs during filling. Removal of fuel vapors is an environmental problem the solution of which has been addressed by the industry. The apparatus of this invention not only provides a convenient fuel-filling method, but can minimize the release of fuel vapors into the atmosphere. Additional equipment (not shown) is required to clean the air removed by first blower 74.

After fueling is completed, main hydraulic lift cylinder 66 retracts. Retainer ring 108, which is a part of frame assembly 90, serves to engage base element 116 of nozzle member 112 and assist in withdrawing nozzle member 112 with inlet 36. Main hydraulic cylinder 66 and hydraulic probe cylinder 72 fully retract and first blower 74 is turned off. The control mean not shown resets itself in preparation for the next vehicle to be fueled.

The apparatus of this invention may be made using available materials and assembly methods. As previously noted, pit 44 is constructed of concrete, and mounting plate 54 is preferably a thick steel plate. Vehicle support surfaces 58 may be steel grating strong enough to carry the weight of an vehicle driving thereover. Sliding doors 22 may also be made of steel plates sufficient to support the weight of vehicles driving thereover when they are closed.

Hydraulic supply 62 may be a standard hydraulic supply mechanism. Fuel pump 64 may be a high-pressure pump designed to fill fuel tanks at a rapid rate. However, a slower pumping rate may be used. The fuel pipes and fuel lines will be chosen to accommodate the fuel pressures selected and the rate of flow selected. Flexible fuel line 138 and flexible fuel hose 140 will be made of materials which are not attacked by the gasoline or other fluid fuel pumped by the filling system of this invention. Fuel line 138 is preferably a flexible metal tube made of a closely-coiled metal strip. Such tubes are commercially available. Flexible fuel hose 140 preferably is made of a supple material so that it will not restrain the air-ride movement of nozzle member 112. One suitable material for flexible fuel hose 140 is neoprene. Instead of being made of a single piece, flexible fuel hose may be may of a plurality of sections oriented in different directions and interconnected by flexible elbows. Such a construction can impose very little resistance to the air-ride action of nozzle member 112.

Main hydraulic lift cylinder 66 and hydraulic probe cylinder 72 may be chosen from existing hydraulic lift equipment. Appropriate switching and control means (not shown) will be apparent to those skilled in the art who are familiar with this invention.

First and second blowers 74 and 76 may be selected from commercially-available blower equipment, and air hoses 102 and 104 may similarly be selected from available materials. In selecting hoses 102 and 104, materials which are insoluble to the liquid fuel should be selected.

Pedestal plate 82 and frame base plate 88 are preferably sturdy steel plates. One-way spring-loaded valves 84 may be selected from commercially-available devices. Resilient elastic mounting bearing 86 may be made of natural rubber or synthetic elastomers chosen for strength and durability, and resistance to attack by the liquid fuel. Frusto-conical funnel 92, flat horizontal bed member 94, and cylindrical edge wall 96 are all of strong metal construction.

Nozzle member 112 is preferably made of a lightweight metal such as aluminum or of a rigid strong plastic material such as fluorinated high-density polyethylene or a rigid unplasticized polyvinyl chloride. Cone 114 may be integrally formed with base element 116 or the two elements may be connected.

Photocell lights 154 and 160 are sending and receiving units which are commercially available. Reflectors 158 and 162 are also of a commercially-available type. Outer horizontal wall 164, inner horizontal wall 166, standpipe 172 and sector doors 188 are all preferably of steel construction. Sector doors 188 may be coated with a sealing layer so that together they form a reasonable fluid-tight seal when the nozzle member is withdrawn.

Seal material 182 and edge seal 184 may be made of neoprene, a fiber-reinforced elastomer, or any sealing material which is immune to attack by the fluid fuel.

Substantial variations may be made in the apparatus described. For example, variations may be made in the means by which the vertical position of tank is sensed. And, a variety of sensing means could be used to determine when frame assembly 90 has reached its intermediate position just below fuel tank 30. Likewise, a variety of sensing means can be used to determine when nozzle member 112 is vertically aligned with inlet 36. Many structural variations are possible as well.

While the principles of this invention have been described in connection with specific embodiments, it should be understood clearly that these descriptions are made only by way of example and are not intended to limit the scope of the invention.

What is claimed:

1. Below-ground apparatus for fueling a stationary vehicle on the ground above it through an inlet on an exposed vehicle tank bottom comprising:
   a vertically-movable frame;
   an upwardly-facing nozzle member carried by the frame;
   lift means below the frame for moving the frame during each fueling operation between a retracted below-ground position in which the nozzle member is not engaged with the inlet and a fueling position in which the nozzle member and the inlet are engaged;
   sensing means to sense the vertical position of said tank;
   stopping means responsive to said sensing means to stop the lift means when the frame reaches an intermediate vertical position beneath the tank; and
   positioning means to position the nozzle member on the frame in vertical alignment with said inlet, whereby further upward movement of the frame causes engagement of said nozzle member with said tank inlet.

2. The apparatus of claim 1 wherein the sensing means is means to sense the vertical position of said tank bottom.

3. The apparatus of claim 2 wherein said sensing means comprises probe means extendible vertically to contact said tank bottom.

4. The apparatus of claim 3 wherein:
   said probe means includes means to keep it at its extended position of contact with said tank bottom and first signal means thereon; and
   said responsive means has second signal means interactive with said first signal means when the frame reaches said intermediate position.

5. The apparatus of claim 4 wherein one of said first and second signal means is a photocell device and the other of said first and second means is a reflector, said first and second means each being positioned and oriented to interact.

6. The apparatus of claim 1 wherein the frame includes means for supporting the nozzle member at horizontal positions in any radial direction from a fixed vertical axis, and means limiting the radial spacing of the nozzle member from said axis.

7. The apparatus of claim 6 wherein said positioning means comprises means to release the nozzle member from the frame to allow it to move horizontally with respect to said frame.

8. The apparatus of claim 7 wherein said positioning means further comprises means to move the nozzle member horizontally.

9. The apparatus of claim 7 wherein said release means is air-ride means.

10. The apparatus of claim 9 wherein:
    said support means includes an air bed having a generally horizontal upper surface with an array of apertures;
    said limiting means includes an edge around said surface;
    said release means includes blower means to supply air through said apertures to create an air cushion between the upper surface and the nozzle member; and
    said nozzle member having a vertically-oriented outlet member and a base element with a horizontal lower surface on the upper surface of the support means.

11. The apparatus of claim 10 wherein the positioning means further comprises means to tilt the horizontal upper surface in various directions to move the nozzle member horizontally.

12. The apparatus of claim 10 wherein the positioning means further comprises means secured to the nozzle member to detect the location of the inlet, and means to deactivate the blower means in response to the detection means thereby allowing the nozzle member to come to rest on the horizontal upper surface in said vertical alignment.

13. The apparatus of claim 12 further comprising means to hold the nozzle member in such alignment during movement to the fueling position, said holding means comprising vacuum means to draw air through said apertures, said vacuum means serving also to withdraw fuel vapors and spillage during fueling.

14. The apparatus of claim 12 wherein the detecting means comprises photocell means.

15. The apparatus of claim 10 wherein the base element has a planar contact edge surrounding the lower surface, said lower surface being recessed from the planar contact edge.

16. The apparatus of claim 15 wherein said outlet member comprises a cone having a broad proximal end secured to the base element, a tapered wall extending from the proximal end to a narrow distal end, and a fuel outlet formed in the distal end.

17. The apparatus of claim 16 wherein the positioning means further comprises at least two photocell devices secured to the tapered wall and directed upwardly to detect reflector means the concurrent detection of which by said at least two photocell devices indicates alignment of the nozzle member with the inlet.

18. The apparatus of claim 1 wherein said nozzle member comprises a cone having a broad proximal end, a tapered wall extending from the proximal end to a narrow distal end, and a fuel outlet formed in the distal end.

19. The below-ground apparatus of claim 1 together with control means including an above-ground control panel positioned for operation from a vehicle before the vehicle is driven to a position above said below-ground apparatus.

20. A method for automatic fueling, without manual intervention of a stationary ground-supported vehicle through an inlet on an exposed vehicle tank bottom by means of below-ground apparatus beneath the vehicle comprising:
sensing the vertical position of the tank;
lifting a vertically-movable frame from a retracted below-ground position to an intermediate vertical position fixed by the sensing step, said frame carrying an upwardly-facing nozzle member which is not engaged with the inlet when the frame is in the retracted and intermediate positions;
positioning the nozzle member on the frame in vertical alignment with said inlet; and
further lifting the frame until the nozzle member engages the inlet, thereby allowing fueling to proceed.

21. The method of claim 20 wherein said sensing step comprises sensing the position of said tank bottom.

22. The method of claim 21 wherein said sensing step includes raising a probe means until it contacts said tank bottom.

23. The method of claim 22 including the further step, after said sensing step, of keeping the probe means in its position of contact with said tank bottom during said lifting step, said probe means including a first signal means.

24. The method of claim 23 wherein said frame has a second signal means interactive with the first signal means, and further including the step of discontinuing said lifting step in response to interaction of the first and second signal means.

25. The method of claim 20 wherein the positioning step includes releasing the nozzle member from engagement with the frame, moving it horizontally with respect to said frame, and depositing it back in contact with said frame.

26. The method of claim 25 wherein the releasing step includes blowing air under the nozzle member to create an air-ride.

27. The method of claim 25 including the additional step, after said positioning step, of securing the nozzle member to the frame in its position of alignment.

28. The method of claim 27 wherein the securing step includes evacuating air around and beneath the nozzle member and the frame, said evacuating step serving also to remove fuel vapors and spillage during filling.

29. The method of claim 28 wherein the releasing step includes blowing air under the nozzle member to create an air-ride.

* * * * *